Jan. 29, 1924.
A. F. MAIN ET AL
1,481,805
MACHINE FOR CUTTING DOUGH OR SIMILAR MATERIAL
Filed Feb. 11, 1921    2 Sheets-Sheet 1
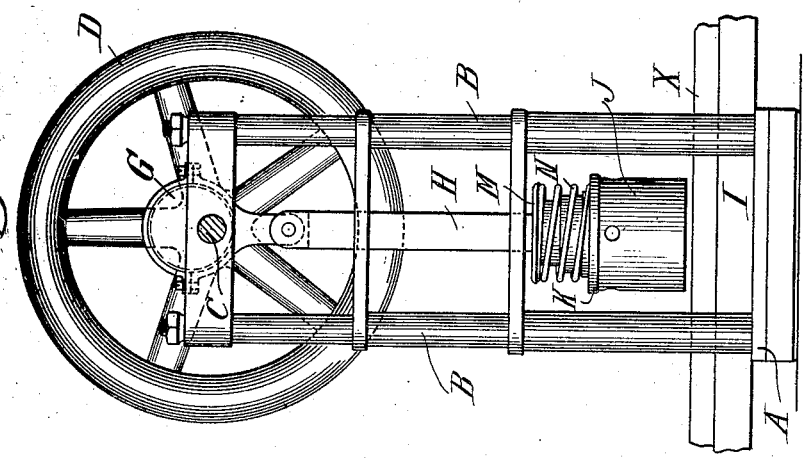
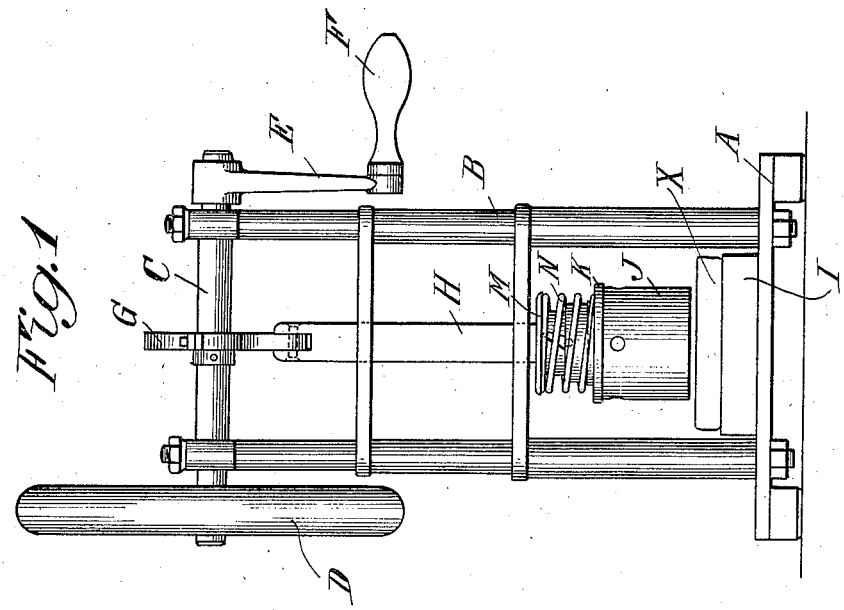
INVENTORS
Albert F. Main
BY Frank A. Adams
Harold E. Stonebraker,
their Attorney Jan. 29, 1924.  1,481,805
A. F. MAIN ET AL
MACHINE FOR CUTTING DOUGH OR SIMILAR MATERIAL
Filed Feb. 11, 1921  2 Sheets-Sheet 2
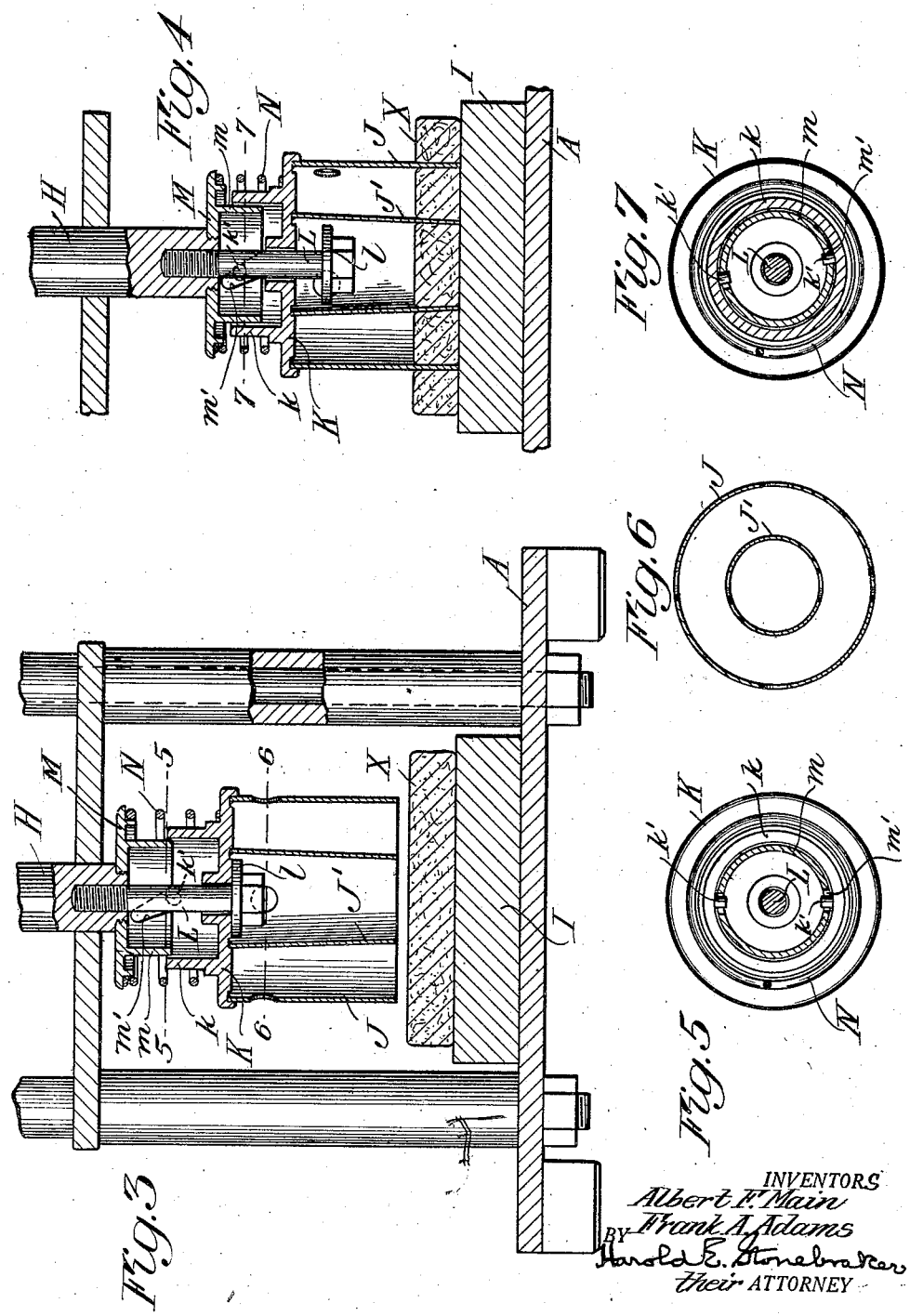
INVENTORS
Albert F. Main
Frank A. Adams
BY Harold E. Stonebraker
their ATTORNEY Patented Jan. 29, 1924.

1,481,805

UNITED STATES PATENT OFFICE.

ALBERT F. MAIN AND FRANK A. ADAMS, OF ROCHESTER, NEW YORK.

MACHINE FOR CUTTING DOUGH OR SIMILAR MATERIAL.

Application filed February 11, 1921. Serial No. 444,246.

*To all whom it may concern:*

Be it known that we, ALBERT F. MAIN and FRANK A. ADAMS, both citizens of the United States of America, residing at Rochester, in the county of Monroe and State of New York, have invented certain new and useful Improvements in Machines for Cutting Dough or Similar Material, of which the following is a specification.

Our invention relates to a machine for cutting dough or similar material and has for its purpose to afford a simple and practical mechanism which can be used to cut circular forms such as doughnuts, quickly and efficiently.

In its more specific aspect, the invention is intended to provide a mechanism by which a knife can be given two movements simultaneously, that is, both into the material to be cut and laterally of the same, similar to the motion which characterizes cutting circular forms out of dough with a hand-cutter, where the knife is pressed into the dough and at the same time given a rotary motion.

Another purpose of the invention is to so mount the knife that it has a slight universal motion on its support, as well as being yieldable, thus causing the knife to readily accommodate itself to any inequalities in the surface upon which the dough is supported.

The invention also comprehends certain other improvements and advantages, all of which will be clear from the following description, in conjunction with the accompanying drawings, while the novel features of the invention will be pointed out in the claims following the specification.

In the drawings:

Figure 1 is a front elevation of a machine for cutting dough, showing a preferred application of the invention.

Figure 2 is a side elevation.

Figure 3 is an enlarged sectional view illustrating the knife and knife support in elevated position.

Figure 4 is a similar view showing the knife in its lowermost position.

Figure 5 is a horizontal sectional view on line 5—5 of Figure 3.

Figure 6 is a sectional view on line 6—6 of Figure 3, and

Figure 7 is a sectional view on line 7—7 of Figure 4.

The invention is susceptible of different embodiments, and is applicable to the cutting of any tough or plastic material such as dough, which is extremely difficult to cut with a knife having a single movement transversely of the material. The disclosure of this application is intended to represent a preferred arrangement of the invention in a practical mechanism, but it is to be understood that this is merely one example of various possible embodiments to which the improvements may be applied.

With this in view, we have illustrated a machine for cutting doughnuts, and while only one knife or cutting member is illustrated, it will be apparent that the invention is applicable to mechanisms involving a multiplicity of knives for cutting a large number of pieces from the dough simultaneously. The machine comprises a base A, vertical standards B, and an operating spindle C journaled in bearings suitably mounted on said standards B. Secured to the spindle C is a fly wheel D, and a crank E, provided with an operating handle F, by which the machine is actuated.

Mounted on the spindle C is an eccentric G, which is operatively connected with and serves to reciprocate the knife support H. The knife support H has mounted thereon the knife or cutter, and is adapted to reciprocate, toward and from the dough, represented by X, and supported on the bed I which rests on the base A. The parts which have thus far been described are not novel, and are illustrated merely to show a conventional means for moving a knife to and from a plastic body, and the novel cutter mechanism which will now be described may be used on any type of machine for cutting plastic material.

The knife or cutter comprises two blades J and J', each of annular formation, and fixedly attached to a head K which is provided with a collar *k*, for a purpose that will appear presently. The head K is supported by a pin or bolt L which is attached, preferably by a threaded connection, to the bottom of the knife support H, the head K resting on a shoulder *l* formed at the end of the pin L.

Secured to the lower end of the support H is a top plate M and arranged between the top plate M and the head K is a coil spring N, which normally holds the parts in the position shown in Figure 3 and is compressed as shown in Figure 4, when the knife moves into cutting engagement with the dough. Arranged on the top plate M is a collar m, which telescopically engages within the aforesaid collar k, in the manner shown in Figures 3 and 4. It will be seen that the spring N permits the knife to engage the dough yieldably, and yet with sufficient pressure, when the support H moves to its extreme lowermost position, to entirely sever the dough. The spring serves to impart a slight universal motion to the cutter, whereby it readily adjusts itself to any inequalities in the surface of the bed under the dough, and sufficient clearance is afforded between the collars k and m, and between the bolt L and head K, to permit the knife as it comes into contact with the bed, to assume such position on the bed as to entirely cut the dough at every point.

In order to insure complete cutting of the dough, it is desirable to impart to the knife a turning motion as it moves downwardly into the dough and this is accomplished by providing cam ways m' in the collar n, and pins or projections k' in the collar k. As the support H, with the collar m fixed thereon, moves downwardly toward the position shown in Figure 4, the pins k' engage the cam slots m' and the collar k and head K are thereby turned so as to partially rotate the knife which the head carries. This causes the knife to travel in a lateral direction with reference to the dough, so that the knife during its cutting action has a double motion, both transversely, or from top to bottom of the body of dough, and also laterally of the dough, or a turning motion as well as a downward motion. The result of this arrangement is to enable thoroughly and quickly cutting dough, with a mechanism that is just as efficient as the well known hand operation, where an annular knife is forced into a body of dough and at the same time given a slight turning motion.

The invention is not limited to the precise form here shown, but may be modified in various particulars without departing from the underlying novelty which it is sought to protect by this application, residing in mounting a plastic-cutting knife yieldably on a support, and also mounting the knife in such a way as to impart to it a lateral or turning motion as well as its normal cutting motion.

We claim:

1. In a machine for cutting dough or similar material, the combination with a support movable toward the material to be cut, of an annular knife yieldably mounted on the support, said knife and support being provided with a cooperating cam way and projection whereby a turning movement is imparted to the knife as it enters the material to be cut.

2. In a machine for cutting dough or similar material, the combination with a support movable toward the material to be cut, of an annular knife mounted on the support, a spring arranged between the support and the knife, and cooperating telescoping collars on the support and knife respectively, one of said collars having a cam way and the other of said collars having a projection engaging said cam way whereby a rotary motion is imparted to the knife as it enters the material to be cut.

3. In a machine for cutting dough, the combination with a support movable vertically toward the material to be cut, of a knife mounted on the support and yieldable vertically thereon as it engages the dough, and instrumentalities acting to impart a turning motion to the knife as it enters the material to be cut.

In witness whereof, we have hereunto signed our names.

ALBERT F. MAIN.
FRANK A. ADAMS.